VIDICON TARGET VOLTAGE CONTROL SYSTEM WITH DARK CURRENT COMPENSATION

Filed Aug. 24, 1962 2 Sheets-Sheet 1

INVENTORS
MORRIS ALTMAN
LOUIS L. POURCIAU
CHARLES E. TAGGART

BY H. S. Mackey

ATTORNEY.

*INVENTOR.*
MORRIS ALTMAN
LOUIS L. POURCIAU
CHARLES E. TAGGART
*BY*
H. S. Mackey
ATTORNEY United States Patent Office 3,180,934

Patented Apr. 27, 1965

3,180,934

VIDICON TARGET VOLTAGE CONTROL SYSTEM WITH DARK CURRENT COMPENSATION

Morris Altman, Putnam Valley, Louis L. Pourciau, Pleasantville, and Charles E. Taggart, Mount Kisco, N.Y., assignors to General Precision, Inc., a corporation of Delaware Filed Aug. 24, 1962, Ser. No. 219,188
8 Claims. (Cl. 178—7.2)

This invention relates to apparatus for controlling and amplifying the video signal generated by a television camera.

The video signal of a television system normally is generated in the first instance by a television camera tube such as a "Vidicon." The scene to be televised is projected optically upon a signal or target electrode which is scanned by an electron beam thereby generating the video signal. This signal is at an extremely low level and must be amplified to obtain a signal having a usable magnitude. It is desirable for most purposes that the signal, after amplification, be maintained at a substantially constant amplitude.

The magnitude of the signal, after amplification, depends primarily on three factors, namely, the brightness of the scene being viewed, the potential of the target electrode, and the gain of the amplifier. It has been customary in the past to adjust the gain of the amplifier to a convenient value and to sample the amplitude of the output signal in order to generate a unidirectional control voltage which is applied to the target electrode in such a sense as to maintain the amplitude of the video output signal substantially constant as scenes of various brightness levels are viewed. Arrangements of this kind have been widely used but are subject to two disadvantages. The first relates to the setting of the gain of the amplifier and the second relates to the adverse effects of the increase in the "dark current" of the pickup tube as the target voltage is increased.

It is obvious that as the gain of an amplifier is increased toward maximum sensitivity, the inherent noise generated by the components of the amplifier, especially in the first stages, is amplified to an increasing extent causing noise to appear in the output. Under adverse conditions, that is, when the level of illumination of the scene is very low, maximum sensitivity is required and a certain amount of noise can be tolerated in order to obtain a useful signal which otherwise would be completely absent. However, if the gain of the amplifier be adjusted for maximum sensitivity, then when a bright scene is viewed the voltage on the target electrode is automatically reduced thereby reducing the amplitude of the input to the amplifier and holding the output substantially constant; but, since the gain of the amplifier is near maximum, the noise in the output remains. On the other hand, if the gain be initially adjusted to a reduced value such that the noise level is not significant, the apparatus operates well when bright scenes are viewed but is incapable of achieving maximum usable sensitivity when dimly illuminated scenes are viewed.

A camera tube such as a "Vidicon" generates a voltage which causes a current to flow in an external circuit such as a resistor. This current comprises two components. The first component increases both with an increase in the illumination and with an increase in the potential of the target electrode and constitutes the useful video ouput signal. The second component is the so-called "dark current" which flows even in the absence of illumination. At low target electrode potentials the dark current is very small and under normal circumstances constitutes an insignificant proportion of the total current. However, as the target electrode potential is increased, the dark current increases sharply and at high electrode potentials constitutes a significant proportion (as much as 50%) of the total current. Under low illumination level conditions, the automatic target control circuit raises the voltage on the target electrode causing an increase in the amplitude of both components with the result that the video signal "rides on top of" the signal due to dark current. It might be thought at first that the dark current signal, being constant for any given electrode potential, would have no effect on the alternating current video amplifier. However, it must be remembered that the scanning operation causes the entire signal, including both the video and dark components, to be reduced to zero periodically at the line rate of the system. The scanning operation thus "chops" the dark signal, effectively converting it to an alternating current signal which is passed through and amplified by the video amplifier. The automatic target voltage control circuit senses peak-to-peak levels and cannot distinguish between the video component and the dark current component and accordingly adjusts the target electrode potential so as to hold the total output signal, video plus dark, substantially constant. This limits the voltage to which the target electrode might advantageously be allowed to rise when low light level scenes are being viewed.

It is a general object of the invention to provide an improved system for controlling a television camera pickup tube and for amplifying the video signal generated thereby.

Another object is to provide such a system by which maximum sensitivity is achieved when dimly illuminated scenes are being viewed yet which provides substantially noise-free operation when brightly illuminated scense are being viewed.

Another object is to provide a system which tends to hold the amplitude of the video signal component substantially constant in spite of the adverse effects of the dark current component.

Briefly stated, the invention comprises the usual wide band video amplifier connected to the camera tube signal electrode. The amplifier includes circuits for adding blanking pulses, clipping at a predetermined level, and for deriving a unidirectional voltage varying with the magnitude of the amplifier output, which voltage is applied to the camera tube so as to increase the voltage on the target electrode as the amplifier output tends to fall. In addition, first and second auxiliary circuits are provided. The first circuit responds to an increase in the voltage of the target electrode and increases the gain of the amplifier, thereby increasing the sensitivity of the system. The second circuit also responds to an increase in the voltage of the target electrode and readjusts the level to which the signal is clipped after the addition of blanking pulses, thereby reducing the proportion of the dark current component of the signal appearing at the output of the amplifier.

For a clearer understanding of the invention reference may be made to the following detailed description and the accompanying drawing, in which.

Figure 1:
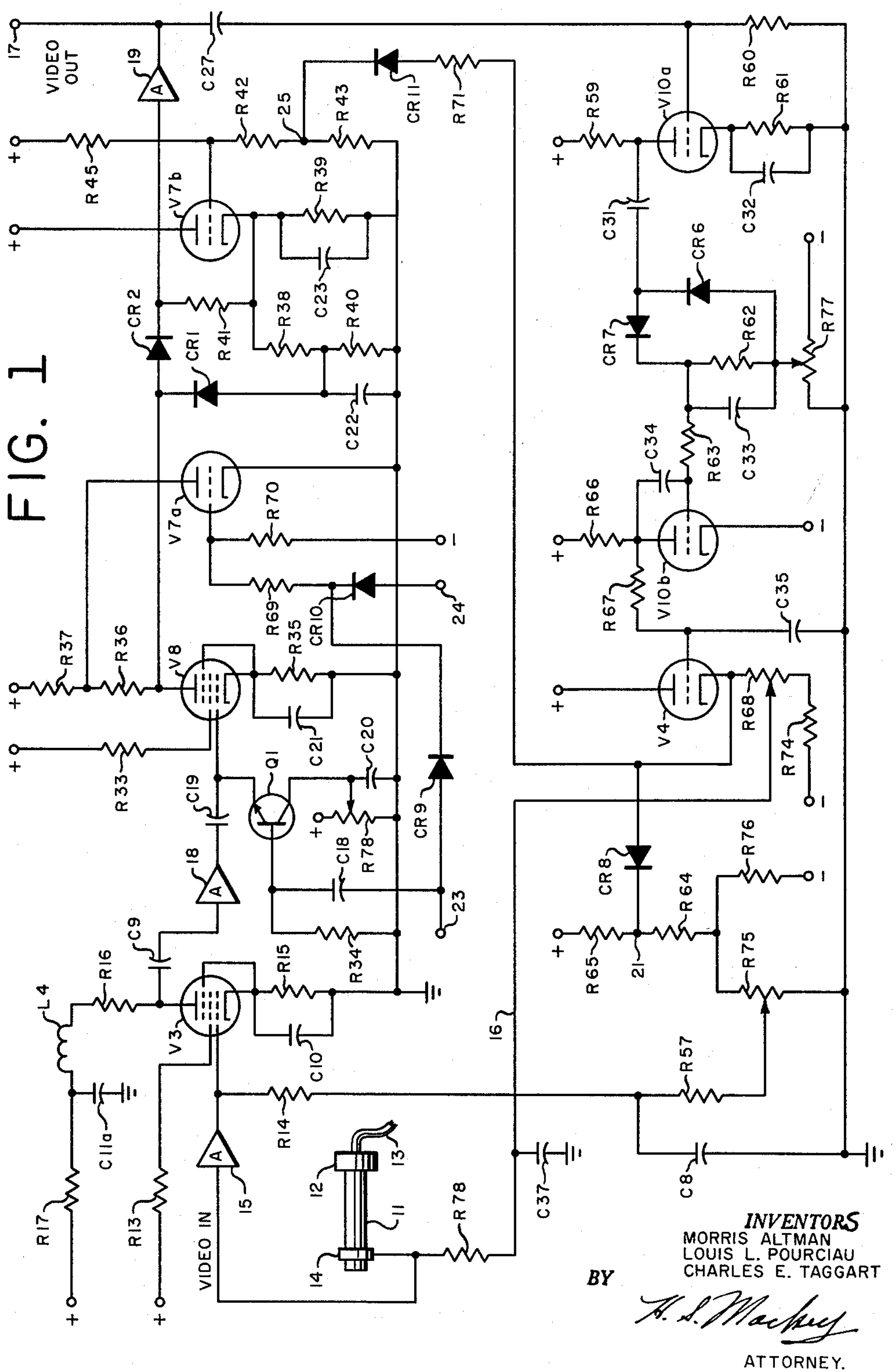
FIGURE 1 is a schematic diagram of the invention.

Referring first to FIGURE 1, there is shown schematically a "Vidicon" camera tube 11 plugged into a socket 12 to which is connected a cable 13 through which operating voltages such as filament voltages, accelerating voltages, etc., are applied. Also shown is an external ring 14 which is electrically connected to the signal or target electrode. A resistor R78 and a capacitor C37 are serially connected in that order between the ring 14 and ground. The video signal is taken from the ring 14 and led to an amplifier 15. The junction of the resistor R78 and the capacitor C37 is connected by a conductor 16 to the slider of a potentiometer R68 by which the unidirectional potential of the target electrode is established and controlled, as will be more fully explained.

The circuit shown in the upper portion of the drawing is a wide band video amplifier. This circuit amplifies the signal, establishes the pedestal level and adds to the signal the usual blanking and synchronizing pulses. The output appears at the terminal 17 in a form suitable for application to a monitor or other appropriate component. The majority of the circuit is of conventional construction and is shown in block form as the previously mentioned amplifier 15, the amplifier 18 and the amplifier 19. Only those portions of the circuit which are pertinent to the present invention are shown in detail.

The amplitude of the output at terminal 17 is held substantially constant by a circuit which adjusts the potential of the target electrode of the vidicon tube 11. A portion of the output signal passes through the capacitor C27 to the grid of a triode V10*a*. The grid of the triode is returned to ground through a resistor R60, the cathode is grounded through a resistor R61 shunted by a capacitor C32, while the anode is connected through a load resistor R59 to a source of positive potential. The triode V10*a* further amplifies the signal and the amplified output appearing at the anode is coupled by a capacitor C31 to a peak detecting circuit comprising the rectifiers, or diodes, CR6 and CR7. The cathode of the diode CR6 and the anode of the diode CR7 are both connected to the coupling capacitor C31. The cathode of the diode CR7 is connected to one terminal of a resistor R62, the other terminal of which is connected to the anode of the diode CR6. The junction of the anode of the diode CR6 and the resistor R62 is connected to the wiper of a potentiometer R77, the extremities of which are connected between a source of negative potential and ground. The resistor R62 is shunted by a capacitor C33. This peak detecting circuit obviously operates to develop a unidirectional voltage across the resistor R62 which is indicative of the peak amplitude of the video signal at terminal 17, smoothed somewhat by the action of the capacitor C33. The potential of the junction of the resistor R62 and the diode CR7 becomes more positive as the ampltude of the output signal increases.

The junction of the resistor R62 and the diode CR7 is connected, through a resistor R63, to the grid of a triode V10*b* the anode of which is connected through a load resistor R66 to a source of positive potential and the cathode of which is connected to a source of negative potential. A capacitor C34 is connected between the anode and the grid. The triode V10*b* acts primarily as a direct coupled amplifier modified, however, by the action of the feedback capacitor C34 which provides smoothing and circuit damping. The amplified and smoothed voltage appearing at the anode of the triode V10*b* is conducted through a resistor R67 to the grid of a triode V4 which grid is also connected to one plate of a capacitor C35, the other plate of which is grounded. The anode of the triode V4 is connected to a source of positive potential while the cathode is connected through a potentiometer R68 and a resistor R74 to a source of negative potential. The triode V4 acts as a cathode follower and provides at its cathode a low impedance source of unidirectional potential indicative of the peak magnitude of the video output signal. The wiper of the potentiometer R68 is connected to the previously mentioned conductor 16 so as to apply a unidirectional potential to the target electrode of the vidicon tube 11.

The apparatus so far described operates as follows. The video signal at the output terminal 17 is amplified by the triode V10*a* and applied to the peak detector circuit. If the amplitude tends to rise, the positive voltage developed across the resistor R62 increases. This voltage change is amplified and reversed in direction by the triode V10*b* so that the potential of the grid of the triode V4 decreases. The potential of the cathode of the triode V4 also decreases, thereby decreasing the potential which is applied through the potentiometer R68 to the target electrode of the vidicon tube 11. This decrease in target electrode potential decreases the amplitude of the video signal generated by the vidicon tube 11 and, accordingly, decreases the amplitude of the input signal applied to the amplifier 15, correspondingly decreasing the output at terminal 17. Obviously any tendency of the output at terminal 17 to decrease causes an opposite sequence of events to increase the voltage applied to the target electrode. Thus the video output at terminal 17 is held substantially constant.

Circuits similar to that above described have been widely used but are subject to the two previously mentioned disadvantages. The first, it will be recalled, is that if the gain of the video amplifier (the chain from the input amplifier 15 through and including the amplifier 19) be adjusted for maximum sensitivity, noise is always present in the output while if the gain be adjusted for noise-free operation, maximum sensitivity cannot be achieved. In accordance with the invention, this disadvantage is overcome by initially adjusting the gain for noise-free operation and automatically increasing the gain when the voltage of the target electrode rises.

The pentode V3 is connected between the amplifiers 15 and 18 and constitutes a variable gain stage. The anode is connected through a resistor R16, an inductance L4 and a resistor R17 to a source of positive potential. A capacitor C11*a* is connected between the junction of the resistor R17 with the inductance L4 and ground. The suppressor is connected to the cathode which in turn is grounded through a resistor R15 shunted by a capacitor C10. The screen is connected through a resistor R13 to a source of positive potential. The grid is connected to the amplifier 15, while the anode is coupled by a capacitor C9 to the input of the amplifier 18.

A voltage divider comprising serially connected resistors R65, R64, and R76 is connected between a source of positive potential and a source of negative potential. A potentiometer R75 is connected between ground and the junction of resistors R64 and R76. The wiper of the potentiometer R75 is connected through resistors R57 and R14 to the grid of the pentode V3. A capacitor C8 is connected between the junction of resistors R57 and R14 and ground. It is obvious that adjustment of the wiper of the potentiometer R75 varies the gain of the pentode V3 and the gain is initially established at a value which provides a substantially noise-free video output.

A diode CR8 has its anode connected to the cathode of the triode V4 and its cathode connected to the junction 21 between resistors R65 and R64. The resistors R65, R64, R75 and R76 and the voltages of the positive and negative sources are selected to make the potential of the junction 21 normally have a first predetermined magnitude, such as approximately 60 volts, in one specific embodiment of the invention. When the vidicon tube 11 is viewing a brightly illuminated scene, or a moderately illuminated scene, the potential of the cathode of the triode V4 will not rise to 60 volts and accordingly the diode CR8 is non-conductive and has no effect. However, when the vidicon tube 11 is viewing a dimly illuminated scene, the control circuit previously described will raise the potential of the cathode of the triode V4 above 60 volts causing the diode CR8 to conduct. The resulting current flow through the potentiometer R75 raises the potential of the wiper and of the grid of the pentode V3 thereby increasing the gain and the sensitivity of the entire system. Although the noise level may also increase, it can be tolerated for the sake of obtaining a usable signal which otherwise might be altogether absent. When the vidicon tube again views a moderately or brightly illuminated scene, the potential of the cathode of the triode V4 falls thereby reducing the gain of the system to a point where substantially noise-free operation is resumed.

It will be recalled that the second disadvantage of an automatic target control system, in the absence of the present invention, is due to dark current. At low levels of illumination the output of the vidicon tube comprises both a useful signal component and a large dark current component. The output of the system at the terminal 17 also comprises these two components and since the automatic control system senses peak values, it tends to raise the target voltage only enough to hold constant the total of video plus dark current components, rather than holding the video component constant. The present invention overcomes this disadvantage by utilizing the target electrode potential as a control signal to vary the level at which the black level of the video signal is clipped, thereby eliminating much of the dark current component which otherwise would appear on the video signal. This effect becomes significant at the higher target electrode potentials.

The output of the amplifier 18 is a negative-going video signal which is coupled through a capacitor C19 to the grid of a pentode V8. The D.C. level is established by a clamp circuit comprising an NPN transistor Q1 the emitter of which is connected to the grid of the tube V8, the collector of which is connected to the slider of a potentiometer R78, and the base of which is connected through a resistor R34 to ground. The potentiometer is connected across a source of positive potential and the slider is connected to one plate of a capacitor C20, the other plate of which is grounded. The base is also coupled through a capacitor C18 to a terminal 23 to which positive polarity, horizontal blanking pulses are applied. These pulses render the transistor conductive only during the blanking interval, thereby clamping the level of the signal at that time to the potential determined by the setting of the slider of the potentiometer R78, normally a few volts above ground.

The clamped signal is applied to the grid of the tube V8 which is a pentode amplifier. The anode is connected through serially connected resistors R36 and R37 to a source of positive potential, the screen is connected through a resistor R33 to a source of positive potential and the suppressor is connected to the cathode which in turn is grounded through a resistor R35 shunted by a capacitor C21. The amplified signal appearing at the anode is a positive-going video signal with the pedestal level determined by the parameters of the circuit and by the D.C. level of the grid.

The blanking pulses are also added to the signal in the anode circuit of tube V8 for a purpose which will appear. A triode V7*a* has its anode connected to the junction of resistors R36 and R37, its cathode grounded, and its grid returned to a source of negative potential through a resistor R70. The horizontal blanking pulse terminal 23 is connected to the anode of a diode CR9, the cathode of which is connected to one terminal of a resistor R69. This same terminal is connected to the cathode of a diode CR10, the anode of which is connected to a terminal 24 to which positive-going, vertical blanking pulses are applied. The other terminal of the resistor R69 is connected to the grid of the triode V7*a* so as to apply the blanking pulses thereto. Since the tubes V8 and V7*a* share the load resistor R37, the signal at the anode of the tube V8 comprises the video signal (here positive going) and the blanking pulses (negative going because of the polarity reversal of the tube V7*a*).

Figure 2:
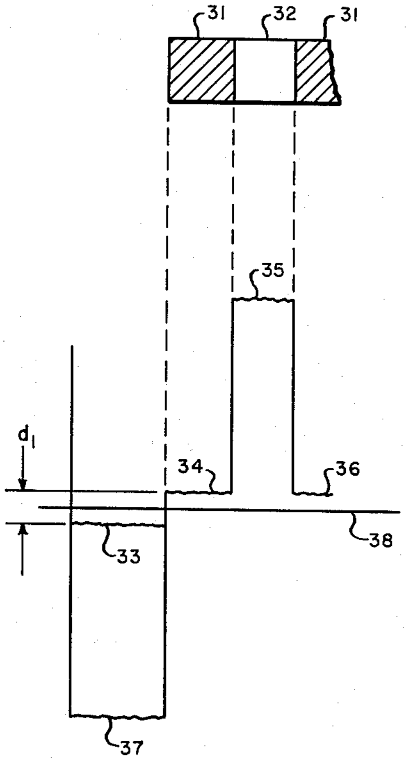
FIGURES 2 and 3 are graphs of waveforms, useful for explaining the invention.

FIGURE 2 depicts, schematically, the signal at the anode of tube V8 when the camera 11 is viewing a bright scene at which time the target electrode voltage is low. It is assumed for simplicity that the camera is viewing a pattern of squares, alternately black and white, such as the squares 31 and 32. During the retrace interval, the pedestal portion 33 of the signal is at its reference level. As a black square 31 is scanned, the potential rises, as shown at 34, rises further, as shown at 35, as a white square is scanned, and falls again as shown at 36 as another black square 31 is scanned. The dark current portion of the signal is represented by $d_1$, the potential difference between portions 33 and 34. All portions show irregularities due to noise. The addition of the blanking pulse during the retrace interval has the effect of lowering the portion 33 of the curve to the position shown at 37. A circuit is provided for clipping off the blanking pulse at the desired level.

Referring again to FIGURE 1, the reference level at which the blanking pulse is clipped is established by the triode V7*b*, the anode of which is connected to a source of positive potential and the cathode of which is returned to ground through a resistor R39 shunted by a large capacitor C23. Serially connected resistors R45, R42 and R43 are connected between a source of positive potential and ground, and the grid of the triode V7*b* is normally held to a substantially constant potential by connecting it to the junction of the resistors R45 and R42. Triode V7*b* acts as a cathode follower providing a low impedance source of substantially constant voltage at its cathode. In one embodiment the parameters were selected to make this reference potential approximately 100 volts.

The anode of the tube V8 is connected to the anode of a diode CR2, the cathode of which is connected to the input of the amplifier 19. A resistor R41 connects the cathode of the diode CR2 to the cathode of the tube V7*b* to establish the potential of the cathode of the diode CR2 at the reference level. It is obvious that only when the potential of the signal on the anode of tube V8 exceeds the reference potential will the diode CR2 conduct and pass the signal to the amplifier 19 and that any portion of the signal below the reference potential will be blocked. The reference potential is selected, as shown at 38, in FIGURE 2, so as to clip the signal a bit below the portion 34 representing the black level. Since the portion 33, containing irregularities due to noise, has been effectively shifted downward to the position 37, clipping at the reference potential shown at 38 removes these noise components and provides a flat pedestal.

The clipping action has been described so far without reference to the diode CR1. Actually, the apparatus would operate without the diode CR1 but in its absence the interelectrode capacitance of the diode CR2 would cause large voltage spikes to appear in the output at the leading and trailing edges of the blanking pulse. To prevent such operation, a small resistor R38 and a large resistor R40 are serially connected between the cathode of the triode V7*b* and ground, establishing at their junction a potential less than that at the cathode. In one embodiment this potential was established at approximately 96 volts. The resistor R40 is shunted by a capacitor C22. The junction of resistors R38 and R40 is connected to the anode of the diode CR1, the cathode of which is connected to the anode of the pentode V8. Any portion of the signal appearing at the anode of the tube V8 which is at a potential less than about 96 volts finds a low resistance path to ground through the diode CR1 and the capacitor C22 and is greatly attenuated. Therefore, the amplitude of the blanking pulse applied to the diode CR2 is reduced thereby reducing the amplitude of the voltage spikes generated.

Figure 3:
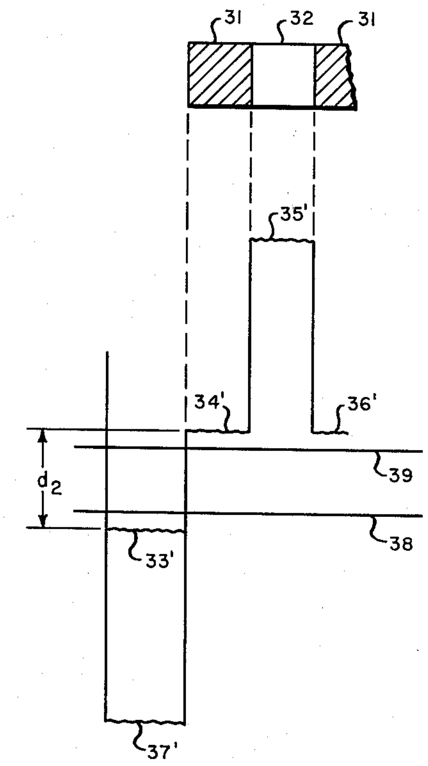

FIGURE 3 shows the signal at the anode of the tube V8 when the camera 11 is viewing the same scene as in FIGURE 2 but under dimly illuminated conditions so that the potential of the target electrode is high. The various portions of the signal analogous to the portions shown in FIGURE 2 are denoted by like, except primed, reference characters. It is to be noted that, in FIGURE 3, there is a large potential difference $d_2$ between the portions 33′ and 34′ which is caused by the large dark current at high target electrode potentials. It is apparent that if the signal were clipped at the same level as before, represented by the reference character 38, the dark current component would remain and would be passed to the amplifier 19. Accordingly, apparatus is provided for altering the clipping level.

Referring again to FIGURE 1, the cathode of the triode V4 is connected through a resistor R71 to the anode of a diode CR11, the cathode of which is connected to the junction 25 of resistors R42 and R43. The parameters of the voltage divider are selected so that the junction 25 is normally held at a second predetermined potential, for example, 50 volts. When the camera tube 11 is viewing a brightly illuminated scene, the cathode of triode V4 does not rise to 50 volts and, accordingly, the diode CR11 does not conduct and has no effect. When a more dimly illuminated scene is viewed, the automatic target voltage control circuit raises the potential of the cathode of the triode V4 and of the target electrode to a point at which the dark current component of the signal becomes significant. In one embodiment of the invention this occurs when the cathode of the triode V4 has risen to about 50 volts. The diode CR11 then conducts, raising the potential of the junction 25 and of the grid of the triode V7*b*. The potential of the cathode of the triode V7*b* also rises, thereby raising the level to which the signal is clipped by the diode CR2. This new level is indicated by the line 39 of FIGURE 3. It is apparent that the result is the elimination of a large part of the dark current component so that the signal passed to the amplifier 19 is of substantially the same form whether the scene be brightly or dimly illumined. Thus the output at the terminal 17 is substantially the useful video signal alone, free of the dark current component. The automatic target voltage control circuit therefore is able to raise the target voltage sufficiently to maintain constant the level of the useful video signal.

It would be possible to connect the anodes of the diodes CR8 and CR11 and the conductor 16 all to the same point, either directly to the cathode of the triode V4 or to the wiper of the potentiometer R68. However, the arrangement illustrated is preferred at present. The characteristics of vidicon camera tubes vary from tube to tube as to the maximum voltage which can be applied to the target electrode advantageously and also as to the voltage at which the dark current becomes significant. By the present arrangement, the voltage at which the diodes CR8 and CR11 conduct can be established once and for all, and compensation for various tubes can be made by adjusting the wiper. The circuit of the triode V4 is designed so that the range of potential levels of the cathode is at or above the corresponding range of levels to which the target electrode of any vidicon likely to be encountered should be set. The wiper of the potentiometer R68 can be adjusted for best operation of the particular vidicon tube being used.

It would be possible to dispense with either or both of the diodes CR8 and CR11 so that the amplifier gain and/or the clipping level would be varied continuously with changes in target electrode voltage. However, the arrangement shown is preferred at present; first, so that the gain may be held at a moderate level except when increased gain is absolutely necessary, and second, because there is no need to readjust the clipping level until the dark current starts to rise sharply.

Although a specific embodiment of the invention has been described in considerable detail for illustrative purposes, many modifications can be made within the spirit of the invention. It is therefore desired that the protection afforded by Letters Patent be limited only by the true scope of the appended claims.

What is claimed is:

1. A television camera control system, comprising,
a light sensitive vidicon tube for generating a video signal,
said tube including an electrode the biasing potential of which controls the magnitude of said signal, an amplifier connected to said tube for increasing the magnitude of said signal,
said amplifier including means for adding blanking pulses to form a composite signal, means for establishing a reference potential and means for clipping said composite signal at the level of said reference potential,
means responsive to the magnitude of the output of said amplifier for controlling the potential of said electrode, and
means for varying said reference potential as a function of the potential of said electrode.

2. A television camera control system, comprising,
a light sensitive vidicon tube for generating a video signal indicative of the scene viewed thereby,
said tube including an electrode the potential of which controls the amplitude of said video signal,
an amplifier connected to said tube for amplifying said video signal,
said amplifier including means for adding blanking pulses to said signal, a circuit for establishing a reference potential level, and means for clipping said signal at said reference potential,
means for generating a control signal indicative of the amplitude of the output of said amplifier,
means for applying said control signal to said electrode whereby said output is maintained substantially constant, and
means for varying said reference potential as a function of said control signal.

3. A television camera control system, comprising,
a light sensitive vidicon tube for generating a video signal indicative of the scene being viewed thereby,
said tube including an electrode the potential of which controls the amplitude of said video signal,
an amplifier connected to said tube for amplifying said video signal,
said amplifier including a circuit for adding blanking pulses and clipping them at reference potential level,
means for generating a control signal indicative of the amplitude of the output of said amplifier,
means for applying said control signal to said electrode whereby said output is maintained substantially constant, and
means for varying said reference potential level when said control signal exceeds a predetermined magnitude.

4. A television camera control system, comprising,
a light sensitive vidicon tube for generating a video signal indicative of the scene being viewed thereby,
said tube including an electrode the potential of which controls the amplitude of said video signal,
an amplifier connected to said tube for increasing the amplitude of said video signal,
said amplifier including an electron tube the conductivity of which is controlled to provide a predetermined reference potential at the cathode thereof,
said amplifier also including means for adding blanking pulses to said signal to form a composite signal and means for clipping said composite signal at the level of said reference potential,
means for generating a control signal indicative of the amplitude of the output of said amplifier,
means for applying said control signal to said electrode, and
means operative when said control signal exceeds a predetermined magnitude for increasing the conductivity of said electron tube.

5. A television camera control system, comprising,
a light sensitive vidicon tube having a target electrode,
said tube being of the class which generates a video signal having first and second components, said first component increasing both with the amount of light incident on said tube and with the potential of said target electrode, said second component increasing with the potential of said target electrode but being independent of the amount of incident light,
an amplifier connected to said tube for increasing the amplitude of said video signal, whereby the output of said amplifier comprises both said first and second components,
said amplifier including means for establishing a first reference potential, means for clamping a portion of said signal to said reference potential, means for adding blanking pulses to that portion of said signal which has been clamped, means for establishing a second reference potential, and means for clipping said signal at the level of said second reference potential,
means for generating a control signal indicative of the amplitude of the output of said amplifier,
means for applying said control signal to said target electrode,
and means operative when said control signal exceeds a predetermined magnitude for varying said second reference potential, whereby the proportion of said second component appearing in the output of said amplifier is reduced.

6. A television camera control system, comprising,
a light sensitive vidicon tube for generating a video signal,
said tube including an electrode the biasing potential of which controls the amplitude of said signal,
an amplifier connected to said tube for increasing the amplitude of said video signal, for adding blanking pulses, for establishing a reference potential, and for clipping said signal at the level of said reference potential,
means responsive to the amplitude of the output of said amplifier for controlling said biasing potential,
means for varying the gain of said amplifier as a function of said biasing potential, and
means for varying said reference potential as a function of said biasing potential.

7. A television camera control system, comprising,
a light sensitive vidicon tube for generating a video signal indicative of the scene viewed thereby,
said tube including an electrode the biasing potential of which controls the amplitude of said video signal,
an amplifier connected to said tube for increasing the amplitude of said video signal,
said amplifier including means for adding blanking pulses, means for establishing a reference potential and means for clipping said video signal at the level of said reference potential,
means for generating a control signal indicative of the amplitude of the output of said amplifier,
means for applying said control signal to said electrode,
means for increasing the gain of said amplifier when said control signal exceeds a first predetermined magnitude, and
means for varying said reference potential when said control signal exceeds a second predetermined magnitude.

8. A television camera control system, comprising,
a light sensitive vidicon camera tube for generating a video signal indicative of the scene viewed thereby,
said tube including a target electrode the potential of which controls the amplitude of the video signal generated by said tube,
an amplifier connected to said tube for increasing the amplitude of said video signal,
said amplifier including a first electron tube having a control electrode the potential of which controls the gain of said amplifier,
said amplifier including a second electron tube the conductivity of which is established to provide a reference potential at the cathode thereof,
means for manually adjusting the potential of said control electrode of said first electron tube,
said amplifier also including means for adding blanking pulses to said signal and means for clipping the resulting signal to the level of said reference potential,
means for generating a control signal indicative of the amplitude of the output of said amplifier,
means for applying said control signal to said target electrode of said camera tube,
means operative when said control signal exceeds a first predetermined magnitude for varying the potential of said control electrode of said first electron tube, and
means operative when said control signal exceeds a second predetermined magnitude for varying the conductivity of said second electron tube.

References Cited by the Examiner

UNITED STATES PATENTS

| | | | |
|---|---|---|---|
| 2,833,957 | 5/58 | Horowitz | 178—7.2 |
| 2,978,537 | 4/61 | Kruse | 178—7.2 |

FOREIGN PATENTS

| | | |
|---|---|---|
| 1,262,729 | 4/61 | France. |

OTHER REFERENCES

Image Orthicon Automatic Beam and Gain Control, Luther RCA TN389, June 1960.

DAVID G. REDINBAUGH, *Primary Examiner.*